United States Patent Office 3,088,201
Patented May 7, 1963

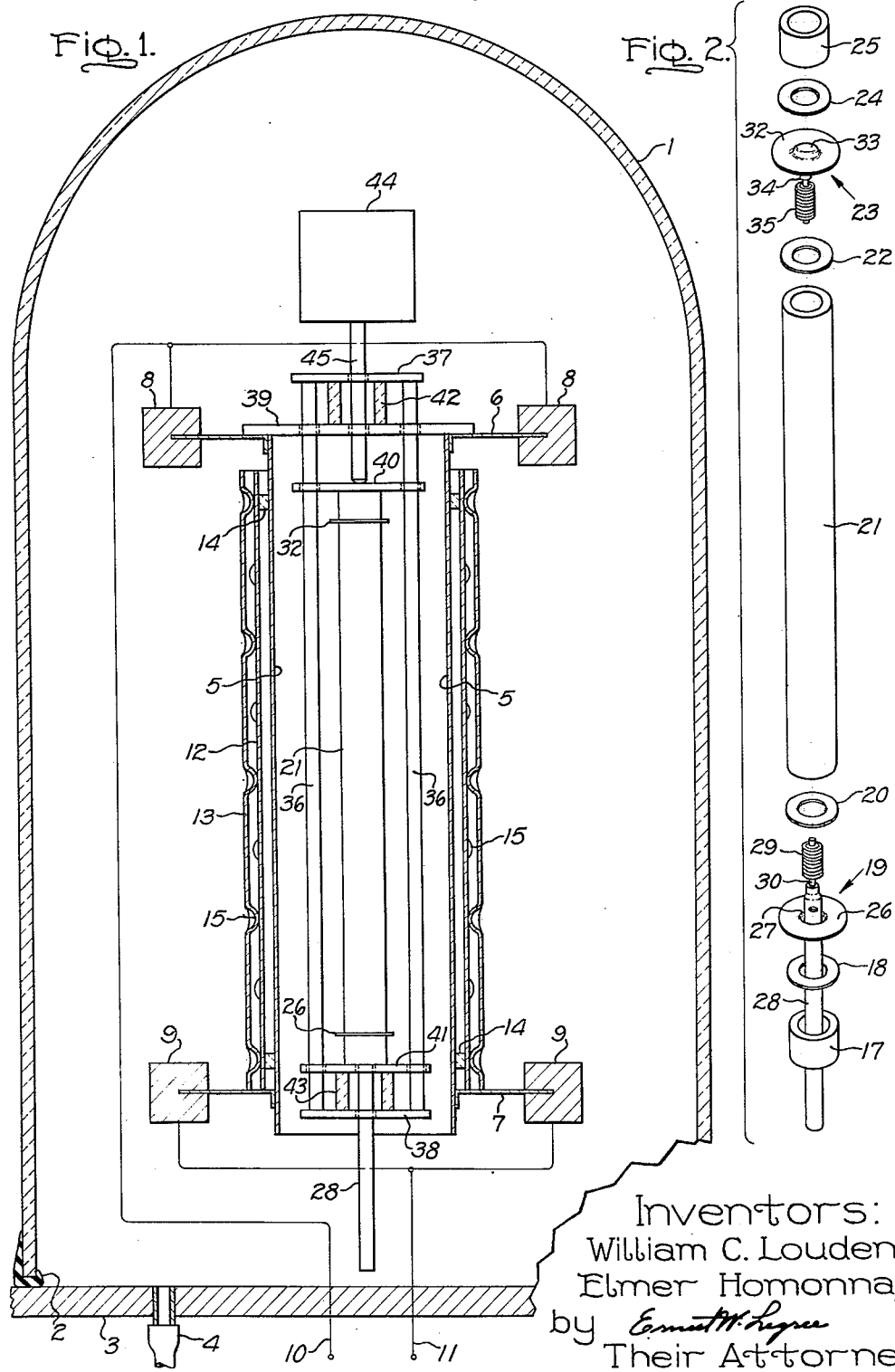

3,088,201
METHOD OF MAKING A CERAMIC-TO-METAL SEAL
William C. Louden, South Euclid, and Elmer Homonnay, Cleveland Heights, Ohio, assignors to General Electric Company, a corporation of New York
Filed Aug. 26, 1959, Ser. No. 836,201
1 Claim. (Cl. 29—471.9)

This invention relates to a hermetic ceramic-to-metal seal and to a method of preparing such a seal or bond. More particularly the invention relates to an improved and simplified single step method for bonding a metal end cap or closure member to a ceramic tube in order to make a hermetically sealed ceramic envelope.

The bonding of certain metals to ceramics has been known for sometime. One method, commonly known as the molybdenum-manganese process and which is described and claimed in Patent 2,667,427, Nolte, assigned to the same assignee as the present invention, involves firing on the surface of the ceramic a mixture of powders comprising manganese and molybdenum. Thereafter a layer of nickel or copper is fired on the molybdenum-manganese layer and finally the metal member is soldered to the nickel or copper layer. In another process described and claimed in Patent 2,570,248, Kelley, likewise assigned to the same assignee of the present invention, titanium hydride $TiH_2$ is applied to the surface of the ceramic and decomposed by heating in a nonoxidizing atmosphere to form a layer of titanium. Thereafter the metal part is soldered to the titanium layer, for instance by means of silver solder.

The foregoing prior art methods involve several steps and an object of the invention is to provide an improved single step sealing process.

A more specific object of the invention is to provide an improved single step process for hermetically bonding metal members to high density polycrystalline alumina resulting in seals better able to withstand high temperature cycling.

Yet another object of the invention is a single step process for providing a high density polycrystalline alumina envelope hermetically sealed with metal closure members or end caps.

In accordance with the invention, an alloy comprising a substantial proportion of nickel, at least 10%, and having a melting point higher than the titanium-nickel eutectic point at approximately 955° C. is used for the sealing member. In addition, the alloy must not have any lower eutectic points with titanium than the titanium-nickel eutectic point. Bonding of the metal alloy to the ceramic is effected by pressing the mating parts together with a thin titanium member or shim interposed between them and heating them in a nonoxidizing atmosphere to a temperature above the brazing temperature of the titanium-nickel eutectic at 955° C., the heating being done in a nonoxidizing atmosphere. However the temperature must not be raised above the brazing temperature of the next higher eutectic formed by the titanium with one of the metals of the alloy, for instance the titanium-iron eutectic at 1060° C. where an Fe-Co-Ni alloy is used.

In a preferred process for sealing high density transparent polycrystalline alumina, an iron-cobalt-nickel alloy consisting of approximately 48% Fe, 26% Co, and 26% Ni is used for the closure member or end cap. This alloy has a coefficient of expansion of approximately $8.5 \times 10^{-6}$ cm./cm./° C. which closely matches that of alumina in the temperature range up to approximately 600° C. The alumina tubing and the Fe-Co-Ni alloy end caps are pressed together with a thin titanium washer shim interposed between them and heated to a temperature above 955° C. but below 1060° C. in a vacuum. Preferably the heating is done by locating the parts within a thin-walled furnace made of tantalum sheet and passing an electric current therethrough, the hot tantalum sheet serving at the same time as a gettering element.

The features of the invention believed to be novel are set forth in the claim appended hereto. The invention however will be better understood from a consideration of the following detailed description and the drawing wherein:

FIG. 1 illustrates a vacuum furnace for carrying out the process of the invention, and FIG. 2 is an exploded view of the parts of an alumina lamp as assembled together in the furnace preparatory to sealing.

Referring to FIG. 1, the one-step sealing process in accordance with the invention may be carried out in the vacuum furnace illustrated therein. The illustration is partly schematic in form and, although it shows laboratory or pilot plant type equipment, obvious modifications will readily adapt it to commercial manufacture. The vacuum enclosure for the furnace comprises a glass bell jar 1 which rests on a plastic or rubber sealing ring 2 seating on a flat base member 3. Evacuation is effected through a suitable pumping system which connects to fitting 4 in the base member.

The furnace proper or oven comprises a thin walled tantalum tube or cylinder 5 having apertured transverse plates 6, 7 of the same material welded to its ends. The edges of the transverse plates 6, 7 are gripped in heavy copper electrodes 8, 9, schematically illustrated only, which support the assembly within the vacuum enclosure and to which current is supplied through conductors 10, 11 for heating cylinder 5 by axial flow therethrough. A heat shield or reflector indicated at 12, 13 consists of a tantalum sheet wrapped twice around cylinder 5. The first wrap around turn 12 of the reflector is insulated from the oven cylinder by means of ceramic spacers 14 and the second turn is spaced from the first by means of staggered embossments 15.

The parts used in making up a sealed alumina device, specifically an intermediate pressure xenon discharge lamp, are shown in an exploded view in FIG. 2. The component parts are pulled apart vertically but are shown in the same sequence as assembled in the furnace for sealing. Starting from the bottom, the illustrated parts comprise a short alumina backing ring 17, a titanium washer shim 18, the lower electrode closure assembly 19, a titanium washer shim 20, alumina envelope or tubing 21, titanium washer shim 22, upper electrode closure assembly 23, titanium washer shim 24, and back-up ring 25. The tubing 21 and also the back-up rings 17 and 25 consist of sintered transparent polycrystalline alumina having a very high alumina content, in excess of 99.5% $Al_2O_3$. This material, though translucent rather than clear like glass, has exceedingly high light-transmittance, as much as 95% of that of clear quartz, and the term transparent is used herein in that sense. This material has a melting point in excess of 1925° C.

The lower electrode closure assembly comprises a metal alloy end cap 26 which is centrally perforated through an outwardly projecting embossment 27 through which is passed a stainless steel tube 28. The end cap is an Fe-Co-Ni alloy in the approximate proportions of 48-26-26 and having a linear coefficient of expansion of approximately $8.5 \times 10^{-6}$ cm./cm./° C. and which closely matches that of the alumina in the temperature range up to about 600° C. The stainless steel tube 28 may be welded or brazed to the disc 2 using a high-temperature brazing alloy to make a hermetic seal. Tube 28 supports on its inner end a cathode 29 consisting of a double-wound tungsten wire coil with the interstices filled with activating material in the form of alkaline earth oxides including barium oxide. The tungsten coils forming the cathode are wound over a tungsten shank 30 which may be welded or pinched in the end of the stainless steel tube 28. The upper electrode closure assembly 23 comprises a nonperforated Fe-Co-Ni alloy end cap 32 having an embossment 33 into which is welded or brazed a short length of stainless steel tubing 34 to which is fastened a cathode 35 similar to that previously described. After the parts have been sealed or bonded together, stainless steel tube 28 is used to evacuate the lamp and to introduce the ionizable medium therein such as a quantity of xenon. Thereafter tube 28 may be pinched off and welded short to seal the completed lamp hermetically.

The lamp parts are assembled in the sequence shown and supported within oven cylinder 5, as illustrated in FIG. 1, by means of a jig comprising molybdenum rods 36 with molybdenum discs 37, 38 welded to their ends. The rods make a sliding fit through molybdenum plate 39 and likewise through intermediate molybdenum discs 40, 41. Molybdenum plate 39 is supported on upper transverse plate 6 of the tantalum oven and a ceramic spacer 42 supports molybdenum disc 37 and thereby the jig assembly. The lamp parts are stacked between the intermediate molybdenum discs 40, 41, the lower disc 41 being supported above lowermost disc 38 by means of a ceramic spacer 43. Ceramic spacers 42 and 43 together permit centering the lamp within the oven cylinder 5. A weight 44 presses down on upper intermediate disc 40 through rod 45 and thereby applies a predetermined pressure to the assembled lamp parts.

The brazing can be started by turning on the electric oven when the vacuum in the enclosure is $3 \times 10^{-5}$ millimeters of mercury or better. During the brazing operation, the pumping system remains in operation to exhaust immediately any gases or vapors which may be liberated at the brazing temperature. The use of tantalum sheet for heating cylinder 5 of the electric oven is beneficial inasmuch as it tends to getter any residual gases. The electric oven is regulated so that a brazing temperature of at least 955° C. but not attaining 1060° C. is reached at the interfaces of the end caps with the alumina parts. It is believed that at a temperature of 955° C., nickel from the Fe-Co-Ni alloy end caps alloys with titanium to form a viscous highly reactive fluid which bonds to the alumina. It has been observed that if a temperature of 1060° C. is exceeded, the end caps may distort or puncture and imperfect seals result. This is believed to be due to the formation of an alloy of iron and titanium and is of course to be avoided.

The specific Fe-Co-Ni alloy described herein is preferred inasmuch as its coefficient of expansion closely matches that of the alumina. As far as bonding is concerned, the exact proportion of nickel is not important provided there is enough of it. Of course the proportion of nickel or other constituents in the alloy may be critical as regards matching coefficients of expansion, such being essential if the seal is to withstand high temperature cycling successfully. Other alloys may be used provided they have melting points higher than the titanium-nickel eutectic and provided further they do not form alloys with titanium having lower eutectic points than the titanium-nickel eutectic point. Otherwise stated, the alloy must be such that when heated in contact with titanium, the first fluid to form is the titanium-nickel alloy.

The surfaces of the alumina parts and of the end cap must be machined or ground flat, for instance to .001", because they must be wetted by the titanium-nickel alloy. The thickness of the titanium washer shims, which preferably should just overlap slightly the alumina surfaces to which a bond is to be made, should be such as to provide sufficient titanium-nickel alloy to form the bond. An excess of titanium is to be avoided because it may weaken the bond or alloy with the iron in the end cap, thereby distorting the end cap or forming holes in it. In general, titanium washers between .001" and .005", for instance about .002" thick provide the best bonds.

It will be appreciated from the foregoing that the invention provides a simple one-step process for sealing metal parts to ceramic and in particular to high-density polycrystalline alumina. Closure members may be sealed to both ends of an alumina tube in a single operation to provide a sealed envelope. Where the envelope is to be made into a discharge device or lamp, the only step remaining is to introduce the ionizable medium and seal off the exhaust tube. If desired, instead of operating the furnace in a vacuum, a filling of the inert gas intended as the ionizable medium for the discharge device or lamp may be used. In such case, the exhaust tube may be dispensed with inasmuch as the lamp is hermetically sealed with the desired filling within it.

Seals made in accordance with the invention are superior to prior art seals in withstanding high temperatures. For instance, in cycling tests at 650° C., the present seals have lasted over four times as long as prior art seals without developing leaks.

The example of the invention which has been described herein in detail is intended as illustrative and not in order to limit the invention thereto except inasmuch as specific limitations may appear in the appended claim.

What we claim as new and desire to secure by Letters Patent of the United States is:

The method of making a sealed transparent high density polycrystalline alumina device which comprises the steps of stacking in sequence such an alumina back-up ring, a thin titanium washer shim, an end cap, a thin titanium washer shim, such an alumina tubing, a thin titanium washer shim, an end cap, a thin titanium washer shim, and such an alumina back-up ring, said end caps consisting of an Fe-Co-Ni alloy in the approximate proportions 48–26–26, pressing the stacked parts together and heating them in a nonoxidizing atmosphere above the titanium-nickel eutectic point at approximately 955° C. but below the titanium-iron eutectic point at approximately 1060° C.

References Cited in the file of this patent

UNITED STATES PATENTS

| | | |
|---|---|---|
| 2,312,350 | Marshall et al. | Mar. 2, 1943 |
| 2,373,117 | Hobrock | Apr. 10, 1945 |
| 2,776,472 | Mesick | Jan. 8, 1957 |
| 2,857,663 | Beggs | Oct. 28, 1958 |
| 2,859,512 | Dijksterhuis et al. | Nov. 11, 1958 |
| 2,882,116 | Williams | Apr. 14, 1959 |
| 2,883,577 | Manfredi | Apr. 21, 1959 |

OTHER REFERENCES

WADC Technical Report 57–434, ASTIA Document No. AD151158, March 1958, pages 22–24 and 68–70. Published by Wright Air Development Center, Wright-Patterson Air Force Base, Ohio.